(12) United States Patent
Aramizu et al.

(10) Patent No.: US 6,493,356 B1
(45) Date of Patent: Dec. 10, 2002

(54) SEGMENTATION AND REASSEMBLY SYSTEM FOR ATM COMMUNICATION NETWORK IMPROVED IN THROUGHPUT

(75) Inventors: Tatsuo Aramizu, Tokyo (JP); Tatsuhiko Amagai, Tokyo (JP); Yasuo Hamakawa, Tokyo (JP); Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,242

(22) Filed: Jan. 7, 1999

(30) Foreign Application Priority Data

Jan. 9, 1998 (JP) .......................................... 10-014931

(51) Int. Cl.$^7$ ................................................ H04J 3/24
(52) U.S. Cl. .................................................... 370/474
(58) Field of Search .............................. 370/392, 395.1, 370/395.7, 474, 412, 389, 464

(56) References Cited

U.S. PATENT DOCUMENTS

| | | | | |
|---|---|---|---|---|
| 5,742,765 A | * | 4/1998 | Wong et al. ................. | 370/465 |
| 5,845,153 A | * | 12/1998 | Sun et al. .................. | 370/395.3 |
| 5,946,325 A | * | 8/1999 | Shiota ....................... | 370/395.7 |
| 5,956,344 A | * | 9/1999 | Cole ......................... | 370/395.6 |
| 5,983,332 A | * | 11/1999 | Watkins ...................... | 711/202 |
| 6,058,114 A | * | 5/2000 | Sethuram et al. ............. | 370/231 |
| 6,075,790 A | * | 6/2000 | Lincoln et al. .............. | 370/398 |
| 6,111,880 A | * | 8/2000 | Rusu et al. ................. | 370/395.53 |
| 6,201,813 B1 | * | 3/2001 | Klausmeier et al. .......... | 370/412 |
| 6,243,382 B1 | * | 6/2001 | O'Neill et al. ............. | 370/395.52 |

FOREIGN PATENT DOCUMENTS

| | | |
|---|---|---|
| JP | 61-173554 | 8/1986 |
| JP | 7-162437 | 6/1995 |
| JP | 7-183887 | 7/1995 |
| JP | 8-6882 | 1/1996 |

* cited by examiner

*Primary Examiner*—Melvin Marcelo
*Assistant Examiner*—Derrick W Ferris
(74) *Attorney, Agent, or Firm*—Sughrue Mion, PLLC

(57) ABSTRACT

A segment and reassembly system cooperates with a data processing system for various kinds of data processing on ATM cells accumulated in frame buffers, and supplies ATM cells to ISDN after completion of various kinds of data processing; wherein the segment and reassembly system has processing units connected through exclusive interfaces to engines incorporated in the data processing system, and the engines process the pieces of data stored in the frame buffers at high speed, thereby improving the throughput of the segmentation and reassembly system.

10 Claims, 6 Drawing Sheets

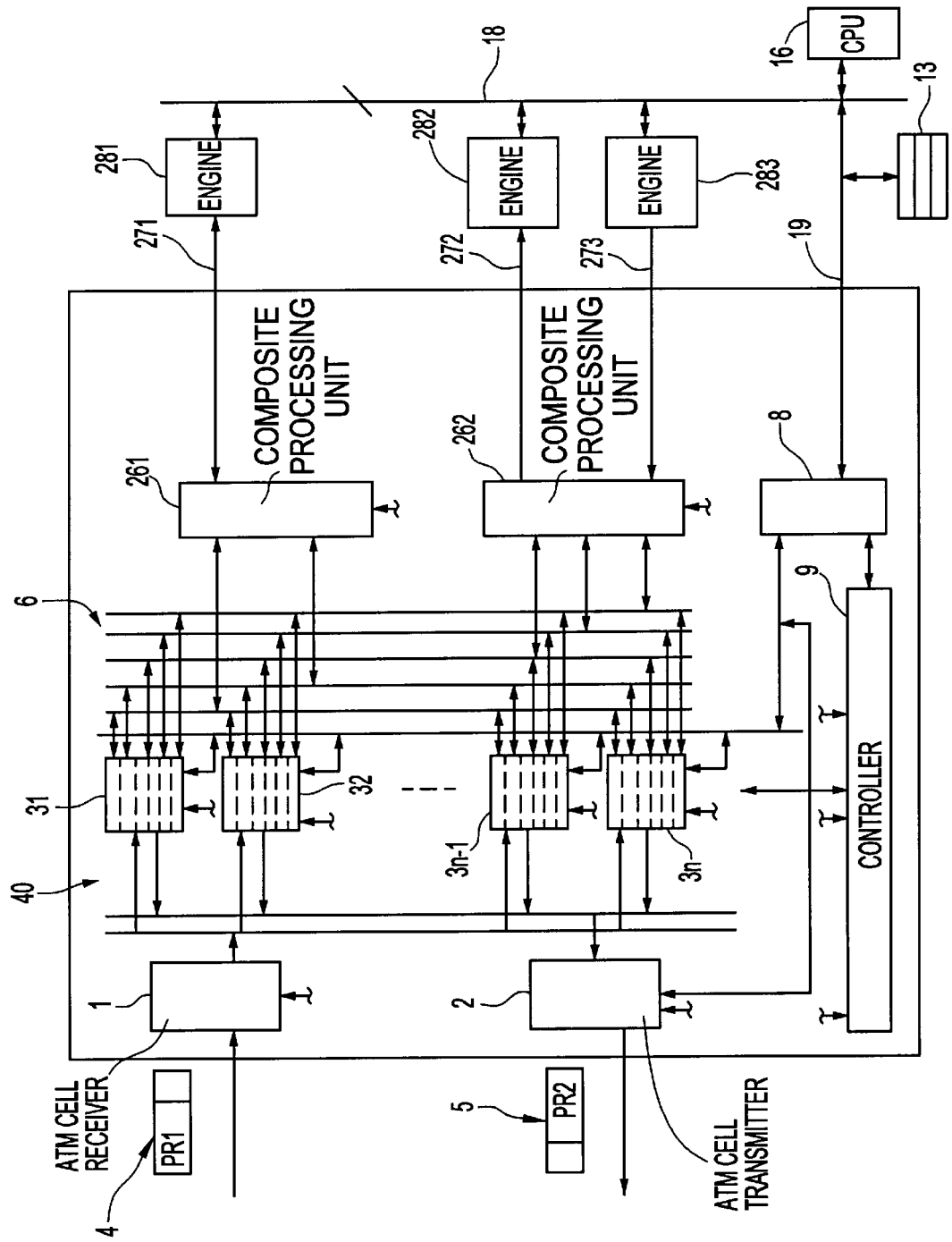

SEGMENTATION AND REASSEMBLY SYSTEM FOR ATM COMMUNICATION NETWORK IMPROVED IN THROUGHPUT

FIELD OF THE INVENTION

This invention relates to an ATM (Asynchronous Transfer Mode) communication network and, more particularly, to a segmentation and reassembly system incorporated in the ATM communication network.

DESCRIPTION OF THE RELATED ART

Conventionally, the segmentation and reassembly system is operative on the ATM adaptation layer of the protocol for the broadband ISDN (Integrated Service Digital Network). The segmentation and reassembly system receives ATM cells, and extracts payloads from the ATM cells. The segmentation and reassembly system assembles the payloads into a frame, and supplies the frame to a data processing system for upper-level software through a bus system.

The segmentation and reassembly system accumulates the pieces of fixed-speed data such as voice data in a frame buffer. If the segmentation and reassembly system accumulates the pieces of voice data supplied through a single channel, the segmentation and reassembly system consumes a lot of time for completing the ATM cell. This results in undesirable time lag.

The segmentation and reassembly system accumulates the pieces of fixed-speed data such as voice data in a frame buffer. If the segmentation and reassembly system accumulates the pieces of voice data supplied through a single channel, the segmentation and reassembly system consumes long time for completing the ATM cell. This results in undesirable time lug.

Japanese Patent Publication of Unexamined Application No. 7-162437 discloses a solution. The prior art ATM cell builder disclosed in the Japanese Patent Publication of Unexamined Application includes a bus switch unit connected to a bus system and plural assembly units connected in parallel to the bus switch unit, and the bus system supplies pieces of voice data through plural channels or time slots to the bus switch unit. The bus switch unit assigns plural channels to each assembly unit, and distributes the pieces of voice data to the assembly units. The assembly unit forms a payload from the pieces of voice data information supplied through the plural channels, and an ATM header and a payload header are added to the payload. In this way, the prior art ATM cell builder assembles the ATM cell, and transfers it through the network.

When the ATM cell arrives at a ATM cell receiver, the payload is disassembled into the pieces of voice data, and pieces of voice data labeled with same discriminative symbol are assembled into a frame. Although the Japanese Patent Publication of Unexamined Application No. 7-162437 is silent as to the data transfer from the ATM receiver to a data processing system for upper-level software, the bus system would be used.

Thus, the prior art segmentation and reassembly system eliminates the time lag due to the assembly work from the data transfer. However, the prior art segmentation and reassembly system suffers from low throughput due to congestion on the bus system.

SUMMARY OF THE INVENTION

It is therefore an important object of the present invention to provide a segmentation and reassembly system, which achieves a high throughput.

It is also an important object of the present invention to provide a segmentation and reassembly system, which allows the manufacturer to reduce the production cost of an associated data processing system.

To accomplish the object, the present invention proposes to share load between at least one exclusive interface and a CPU (Central Processing Unit) interface.

In accordance with one aspect of the present invention, there is provided a segmentation and reassembly system cooperating with a data processing system having at least one central processing unit connected through a CPU interface and special purpose engines, and the segmentation and reassembly system comprises a plurality of frame buffers for storing pieces of data selectively supplied from first ATM cells and a processing means connected to the plurality of frame buffers for selectively accessing the pieces of data and selectively supplying at least selected pieces of data to the special purpose engines through an exclusive interface for modifying the pieces of data, if necessary.

BRIEF DESCRIPTION OF THE DRAWINGS

The features and advantages of the segmentation and reassembly system will be more clearly understood from the following description taken in conjunction with the accompanying drawings in which:

FIG. 6 is a block diagram showing another relation between the pieces of composite data, the composite processing units and the engines incorporated in another segmentation and reassembly system according to the present invention.

DESCRIPTION OF THE PREFERRED EMBODIMENTS

Figure 1:
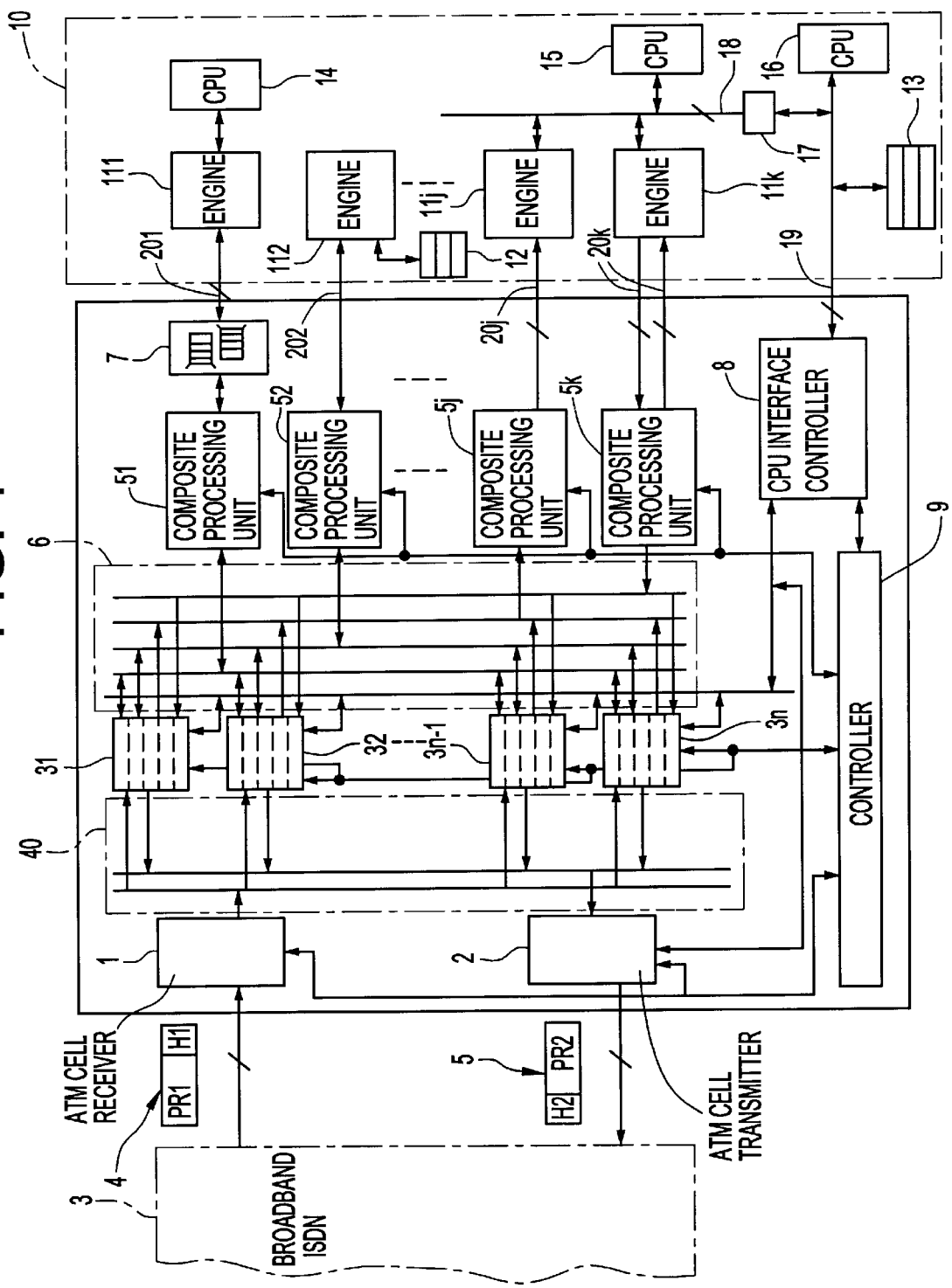
FIG. 1 is a block diagram showing a segmentation and reassembly system according to the present invention.

FIG. 1 illustrates a segmentation and reassembly system embodying the present invention. The segmentation and reassembly system is implemented by a single semiconductor integrated circuit device. The segmentation and reassembly system may be split into plural sections respectively integrated on semiconductor chips connected through suitable interfaces. Otherwise, semiconductor integrated circuit devices and discrete devices may be electrically connected on a printed wiring board or on plural printed wiring boards electrically connected to one another.

The segmentation and reassembly system comprises an ATM cell receiver 1 and an ATM cell transmitter 2. The ATM cell receiver 1 is connected to an ISDN 3, and receives ATM cells 4. The ATM cell 4 has a header H1 and a payload PR1, and pieces of user's data are stored in the payload PR1. The ATM transmitter 2 is also connected to the ISDN 3, and transfers ATM cells 5 to the ISDN 3. The ATM cell 5 also has a header H2 and a payload PR2, and pieces of user's data are stored in the payload PR2. The contents of the header H1/H2 are defined in the protocol for the broadband ISDN. Although only one pair of ATM cell receiver and ATM cell transmitter 1/2 is incorporated in the segmentation and reassembly system, the segmentation and reassembly system may have more than one pair of ATM cell receiver and ATM cell transmitter 1/2.

The segmentation and reassembly system further comprises plural frame buffers 31, 32, . . . , 3n−1 and 3n and an internal bus system 40 connected between the plural frame buffers 31 to 3n and the ATM cell receiver/ATM cell transmitter 1/2. The ATM receiver 1 distributes the pieces of user's data through the internal bus system 40 to the frame buffers 31 to 3n, and the frame buffers 31 to 3n store the pieces of user's data. The pieces of control data stored in the header H1 and pieces of control data necessary for the segmentation and reassembly system are linked with the pieces of user's data, and are also stored in the frame buffers 31 to 3n. The pieces of user's data and those pieces of control data form pieces of composite data, and the pieces of composite data are selectively accumulated in the frame buffers 31 to 3n. A predetermined number of pieces of composite data form a complete frame. Pieces of composite data, which have not formed a frame, yet, are hereinbelow referred to as an "incomplete frame".

If the segmentation and reassembly system is integrated on the single semiconductor chip, the frame buffers 31 to 3n are implemented by a memory macro-block or latch circuits integrated on the semiconductor chip. A suitable semiconductor memory device may be connected to the ATM cell receiver 1 and the ATM cell transmitter 2 integrated on the semiconductor chip or chips. When a manufacturer realizes the segmentation and reassembly system on a printed wiring board, a semiconductor memory device or discrete latch circuits are mounted on the printed wiring board.

The segmentation and reassembly system further comprises composite processing units 51, 52, . . . , 5j and 5k, an internal bus system 6 connected between the frame buffers 31 to 3n and the composite processing units 51 to 5k, a buffer memory 7 connected to the composite processing unit 51, a CPU interface controller 8 for a CPU interface and a controller 9. Though not shown in FIG. 1, the composite processing units 51 to 5k are accompanied with a memory, a data buffer or latch circuits. The memory, a data buffer or the latch circuits may be incorporated in the composite processing units 51 to 5k.

The segmentation and reassembly system is connected to a data processing system 10, which executes an upper-level software. The data processing system 10 includes engines 111/112/ . . . /11j/11k, memory units 12/13, central processing units 14/15/16, a gate 17 and an internal bus system 18. The central processing unit 16, the memory unit 13 and the gate 17 are connected to a CPU interface 19, and the CPU interface controller 8 is also connected to the CPU interface 19. The CPU interface 19 is connectable through the gate 17 to the internal bus system 18, and the engines 111 to 11k are connected to the internal bus system 18. The engine 111 consumes a time period longer than that of the engine 112, and the central processing unit 14 assists the engine 111 in the data processing. On the other hand, the engine 112 is accompanied with the memory 12, and the memory 12 provides a temporary data storage for the engine 112. However, the central processing unit 14 and the memory 12 are not indispensable components. The engine 111 may be connected through the internal bus system 18. If so, the central processing unit 15 or 16 can assist the engine 111 in the data processing. The central processing unit 15 is a special purpose processor, and the central processing unit 16 is a general purpose processor. The data processing system 10 may have more than one general purpose central processing unit and more than one special purpose central processing unit.

Various program sequences for the central processing units 15/16 are stored in the memory 13, and the memory 13 offers a temporary data storage for the central processing units 15/16. The central processing units 15/16 may be accompanied with memories, respectively.

A content addressable memory serves as the engine 111–11k/281–283, by way of example. A central processing unit may be incorporated in the engine 112. The engine 112 may be connected to the internal bus system 18. Thus, the engines are connectable to the CPU interface 19.

The engines 11j/11k are connected through the internal bus system 18 to the special purpose central processing unit 15 and through the internal bus system 18 and the gate 17 to the general purpose central processing unit 16. Central processing units may be incorporated in the engines 11j/11k, respectively.

The CPU interface controller 8 is connected to the CPU interface 19 and the ATM cell transmitter 2, and the frame buffers 31 to 3n are connected through the internal bus system 6 to the CPU interface controller 8. The controller 9 is connected to the ATM cell receiver 1, the ATM cell transmitter 2, the frame buffers 31–3n, the composite processing units 51–5k and the CPU interface controller 8, and controls those components for the following tasks. The buffer memory 7 takes up a difference in data processing speed between the engines 111 and 112. The engine 111 completes the data processing faster than the engine 112, and, for this reason, the engine 111 communicates with the associated composite processing unit 51 through the buffer memory 7. The results of data processing arrive at the associated composite processing units 51/52 without substantial time lag therebetween.

The controller 9 supervises the ATM cell receiver 1, the ATM cell transmitter 2, the composite processing units 51 to 5k and the CPU interface controller 8, and arbitrates the behaviors of those component units 1/2/51–5k/8. Moreover, the controller generates an alarm when an error takes place.

The composite processing units 51 to 5k are connected to the engines 111 to 11k through interfaces 201/202/ . . . /20j/20k, respectively. A composite processing unit 51/52/ . . . /5j/5k may access pieces of composite data stored in the frame buffers 31/32/ . . . /3n−1/3n, and communicates with the associated engine 111/112/ . . . /11k through the interface 201/202/ . . . 20j/20k. Plural composite processing units 51/52/ . . . /5j/5k can sequentially or concurrently access pieces of composite data stored in one of the frame buffers 31 to 3n under the arbitration of the controller 9, and independently communicate with the associated engines 111 to 11k through the interfaces 201 to 20k. The composite processing units 51 to 5k achieve the following tasks. The different tasks may be assigned to the composite processing units 51 to 5k.

The first task is an extraction. The composite processing units 51/52/ . . . /5j/5k access the pieces of composite data forming either incomplete or complete frame stored in the frame buffers 31 to 3n, and sequentially extract the pieces of composite data from the incomplete/complete frames.

The second task is a judgement. The composite processing units 51 to 5k check the pieces of composite data to see whether or not a data processing is required and whether or not the data processing can be done on the pieces of composite data. If the answer given is affirmative, the composite processing units 51 to 5k transfers the pieces of composite data to the associated engines 111 to 11k, and instructs the engines 111 to 11k to carry out the data processing. Certain pieces of composite data are transferred to the associated engines 111 to 11k without any preliminary data processing, and other pieces of composite data are transferred to the associated engines 111 to 11k after a preliminary data processing. The composite processing units 51 to 5k may instruct the engines 111 to 11k to only start a predetermined data processing. Upon completion of the data processing, the engines 111 to 11k return the results of the data processing to the composite processing units 51 to 5k. An engine 51/52/ . . . 5j/5k may supply the result to other engine or engines. The other engine or engines take the result into the data processing executed by itself. The result may cause the other engine or engines simply to start the data processing. The composite processing units 51 to 5k may selectively request the central processing units 14 to 16 to carry out a data processing as similar to the prior art segmentation and reassembly system. The composite processing units 51 to 5k may decide to discard the entire frame.

The third task is an overwriting/insertion/partial discarding. When the results of the data processing arrive at the composite processing units 51 to 5k, the composite processing units 51 to 5k overwrite the results on predetermined portions of the pieces of composite data. The composite processing units 51 to 5k may insert the results into predetermined portions of the pieces of composite data or discard parts of the pieces of composite data. After the overwriting/insertion/partial discarding, the composite processing units 51 to 5k may decide to request the central processing units 14/15/16 to start a data processing carried out in the prior art segmentation and reassembly system. If the result is indicative of certain status, the composite data processing units 51 to 5k may request the central processing units 14 to 16 to start a data processing carried out in the prior art segmentation and reassembly system instead of the overwriting/insertion/partial discarding.

When the composite processing units 51 to 5k decide to overwrite the results, the composite processing units directly overwrite the results on the pieces of composite data stored in the frame buffers 31 to 3n. Otherwise, the composite processing units 51 to 5k store the results in the memory/data buffer/latch circuits (not shown), and replace the predetermined portions of the pieces of composite data with the results when the ATM cell transmitter 2 writes the pieces of composite data stored in the frame buffers 31 to 3n into the data field of the ATM cell 5 assigned to the payload PR2.

If the composite processing units 51 to 5k decide to insert the results into the pieces of composite data, the composite processing units 51 to 5k sequentially rewrite the pieces of composite data stored in the frame buffers 31 to 3n in order to store the results in the frame buffers 31 to 3n together with the pieces of composite data. Otherwise, the composite processing units 51 to 5k store the results in the memory/buffer/latch circuits (not shown), and transfer the results to the ATM cell transmitter 2 at appropriate timing while the ATM cell transmitter 2 is loading the pieces of composite data from the frame buffers 31 to 3n into the data field of the ATM cell 5 assigned to the payload PR2.

If the composite processing units 51 to 5k decide to discard parts of the pieces of composite data, the composite processing units 51 to 5k write a value representative of invalidity in a certain piece of composite data. Otherwise, the composite processing units 51 to 5k instruct the ATM cell transmitter to skip the certain piece of composite data while the ATM cell transmitter 2 is loading the pieces of composite data from the frame buffers 31 to 3n into the data field of the ATM cell 5 assigned to the payload PR2.

Figure 2:
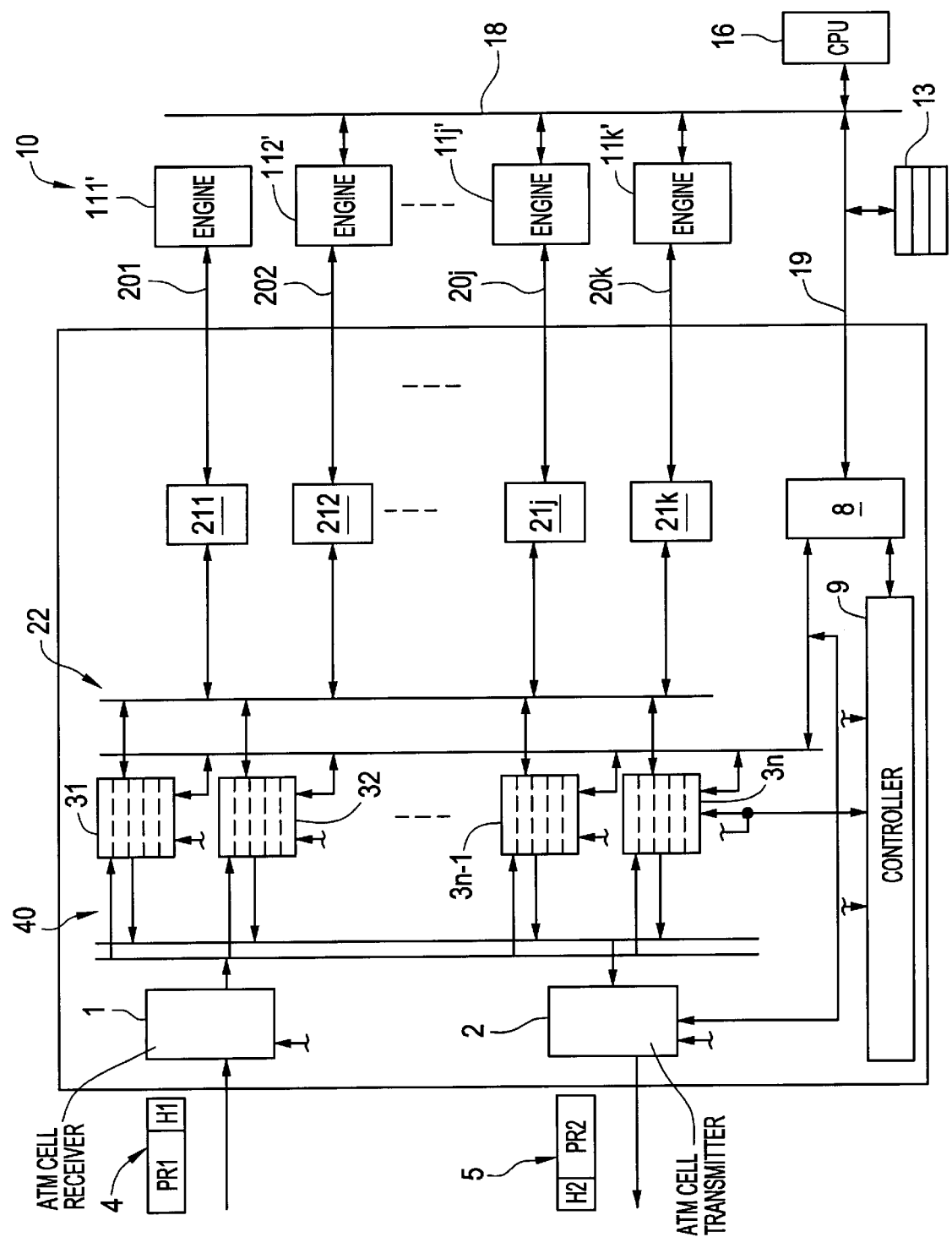
FIG. 2 is a block diagram showing another segmentation and reassembly system according to the present invention.

In another segmentation and reassembly system according to the present invention, plural composite processing units 211 to 21k are connected through an internal bus system 22 to the frame buffers 31 to 3n, and are further connected through the exclusive interfaces 201 to 20k to engines 111' to 11k' as shown in FIG. 2. In this instance, the plural composite processing units 211 to 21k and the engines 111' to 11k' concurrently achieve a same task on pieces of composite data fetched from the frame buffers 31 to 3n.

Figure 3:
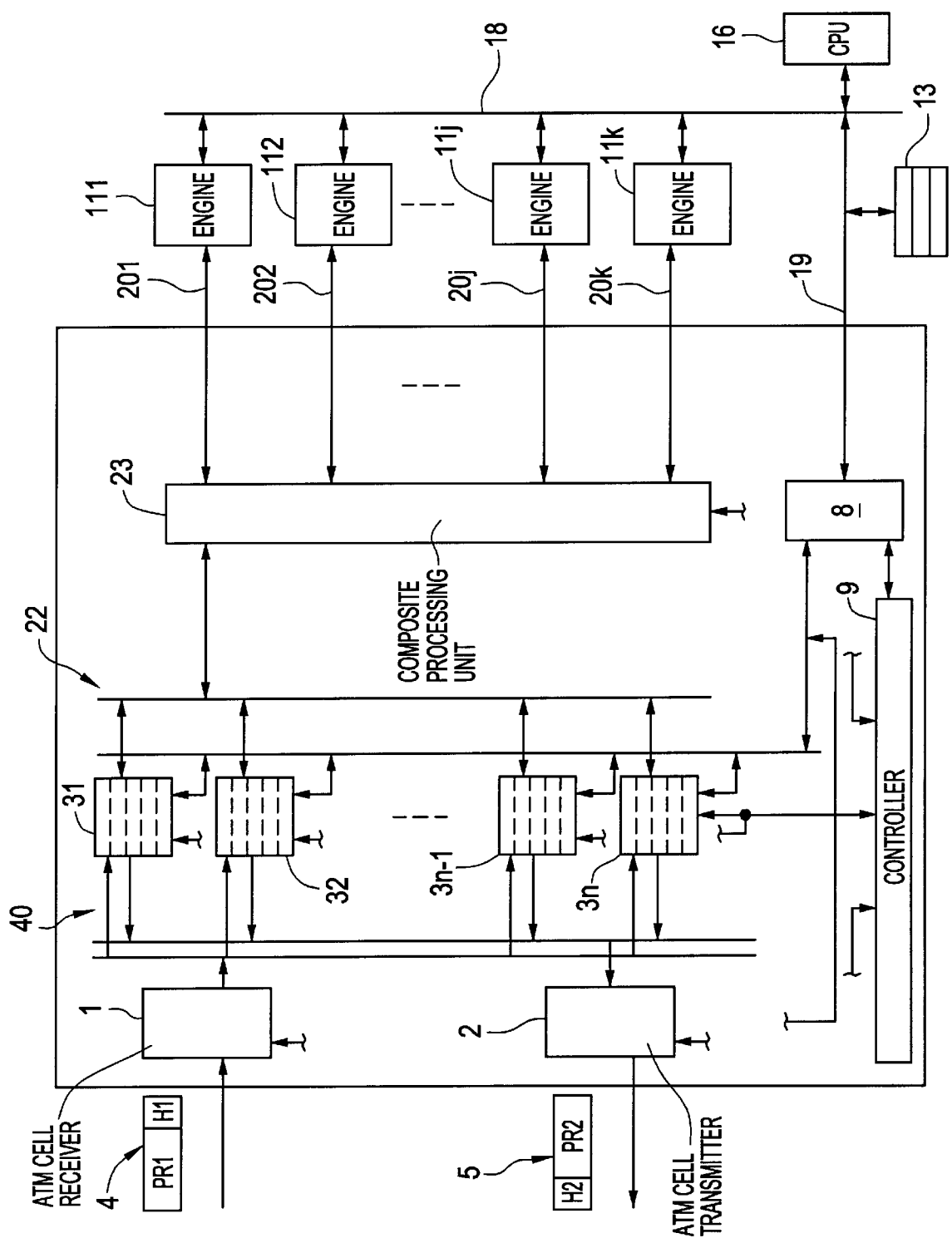
FIG. 3 is a block diagram showing yet another segmentation and reassembly system according to the present invention.
Figure 4:
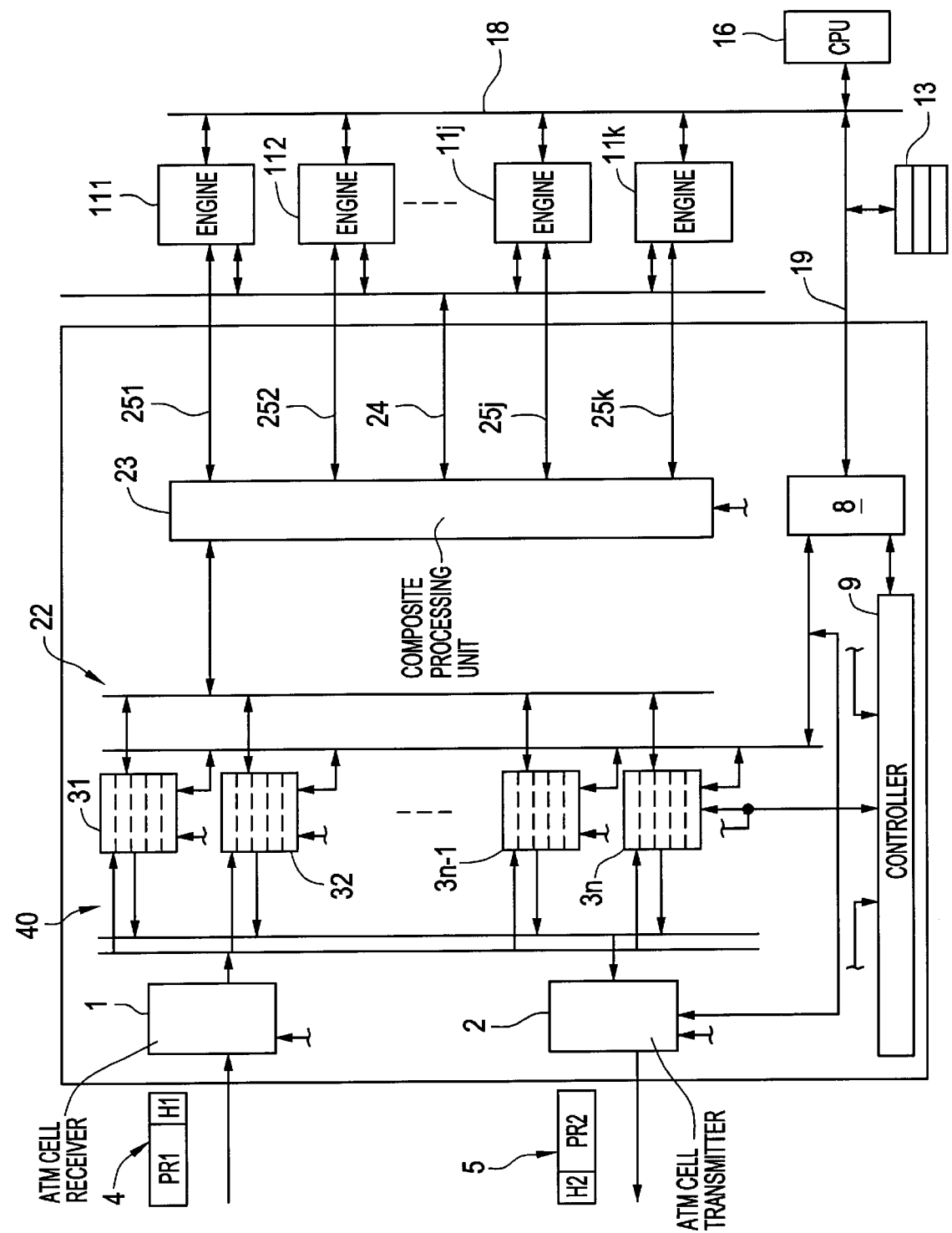
FIG. 4 is a block diagram showing still another segmentation and reassembly system according to the present invention.

In yet another segmentation and reassembly system according to the present invention, a single composite processing unit 23 is connected through the interfaces 201 to 20k to the engines 111 to 11k as shown in FIG. 3. Still another segmentation and reassembly system has the composite processing unit 23 connected through a single interface 24 to the engines 111 to 11k (see FIG. 4), and selectively communicates with the engines 111 to 11k by using control lines 251 to 25k.

Figure 5:
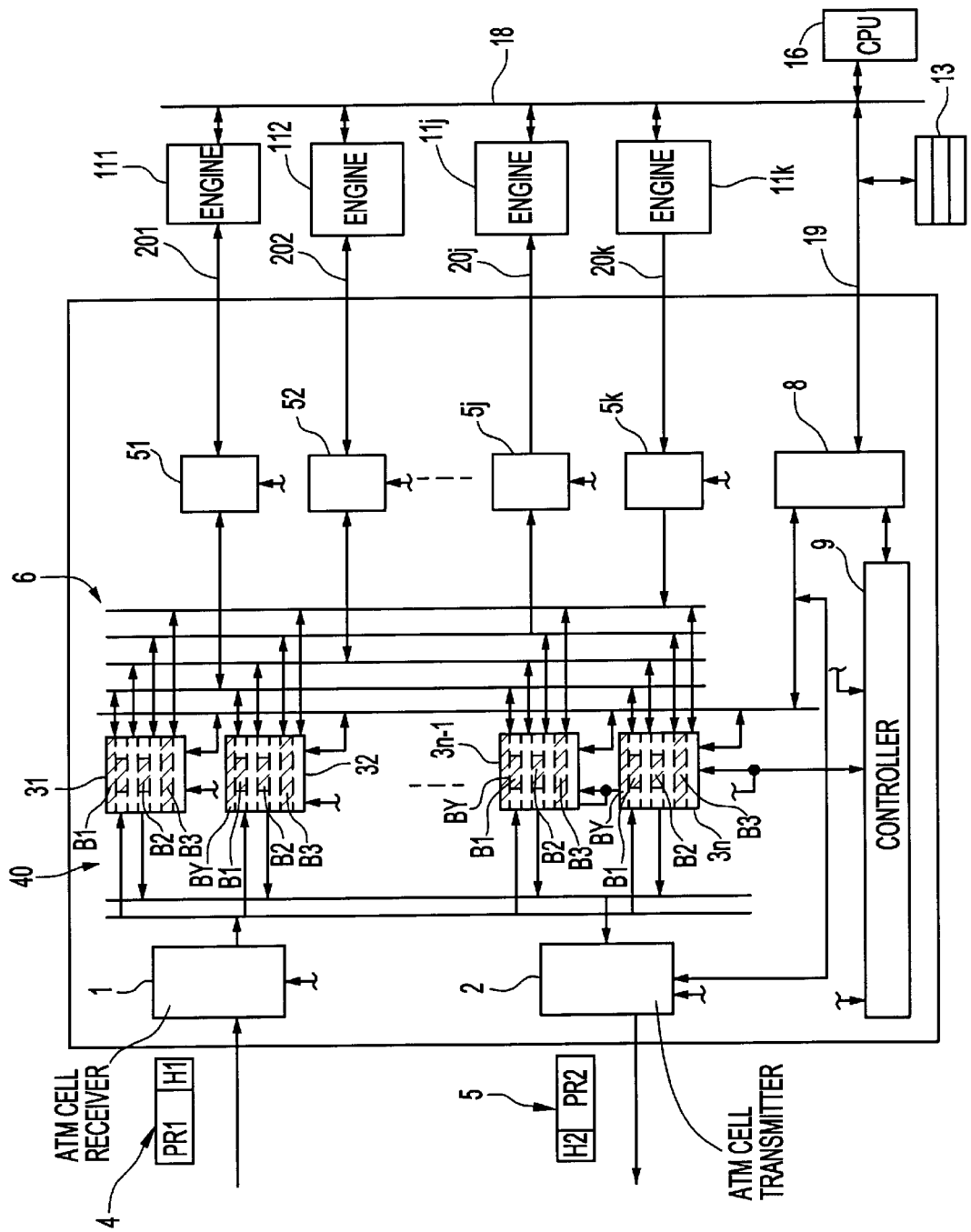
FIG. 5 is a block diagram showing a relation between pieces of composite data stored in frame buffers, composite processing units and engines incorporated in the segmentation and reassembly system shown in FIG. 1.

Turning to FIG. 5, a piece of composite data is labeled with BY, and the piece of composite data BY is corresponding to a byte or bytes. On the other hand, a piece of composite data B1/B2/B3 is corresponding to a bit or bits. The pieces of composite data BY are supplied to the composite processing unit 51, and the pieces of composite data B1 are supplied to the composite processing unit 52. Similarly, the pieces of composite data B2 are assigned to the composite processing unit 5j, and the pieces of composite data B3 are assigned to the composite processing unit 5k. In this instance, the pieces of composite data BY, B1, B2 and B3 are representative of an IPv4 header, a TTL (Time-to-Live) section and a check-sum section. Thus, the composite processing units 51/52/ . . . /5j/5k are respectively assigned the pieces of composite data BY/B1/ . . . /B2/B3, and extract those pieces of composite data BY/B1/ . . . /B2/B3 from the frame buffers 31 to 3n. When the composite processing units 51/52/ . . . /5j/5k decide that data processing is required for the pieces of composite data BY/B1/ . . . /B2/B3, the composite processing units 51 to 5k requests the engines 111 to 11k to start data processing for the pieces of composite data BY/B1/ . . . /B2/B3, or trigger the engines 111 to 11k to carry out an intelligence collection for a statistical analysis. Thus, engines 111 to 11k are exclusively assigned the data processing for the IPv4 header, the TTL section, . . . and check-sum section.

In another segmentation and reassembly system according to the present invention, the pieces of composite data BY/B1 and the pieces of composite data B2/B3 may be assigned to composite processing units 261 and 262, respectively. The composite processing units 261/262 may be connected through an interface 271 and interfaces 272/273 to an engine 281 and engines 282/283 as shown in FIG. 6.

The engines 111–11k/281–283 are assigned particular jobs. The engine 111–11k/281–283 receives a piece of composite data from the associated composite processing unit 51–5k/211–21k/23/261–262, and carries out the data processing on the piece of composite data. Another engine may be triggered by the associated composite processing unit. A result of the data processing is reported from the engine to the associated composite processing unit, and is a kind of message supplied through the associated interface 201–20k/251–25k/271–273 or a notice such as, for example, completion of the data processing supplied through a control signal line forming a part of the interface. The result of data processing may not be supplied to the associated composite processing unit.

The engines 111/112 are assigned data processing on a special/composite protocol, a format conversion and a discard of a frame. The engines 111 to 11k may carry out data processing for different protocols.

The engine 11j only receives the piece of composite data from the associated composite processing unit 5j, and starts a data processing. The engine 11k is communicable with the associated composite processing unit 5k through signal lines represented by a pair of arrows. A trigger signal, the notice and a compressed data are transferred through the signal lines. The engines 11j/11k are connected through the internal bus system 18 to the special purpose central processing unit 15, and the central processing unit 15 can assist the engines 11j/11k in the data processing. A central processing unit may be incorporated in each engine 11j/11k. The engines 11j/11k are further communicable with the general purpose central processing unit 16. The engines 11j/11k may carry out the data collection and the statistic analysis. If there is a difference in data processing speed between the engines 11j and 11k, the engines 11j/11k may be accompanied with a buffer memory like the buffer memory 7.

The engines 111–11k/281–283 achieve the data processing for ATM/IPv4/6 headers, i.e., routing, the protocol conversion between the IPv/4/6/ATM, a counting work for each kind of the frames, the intelligent collection for congestion status and discarded data, the intelligent collection of control bit and control data, the delivery of the control information, a counting work for the control bit and the pieces of control information, a checking work for the TTL field, a subtraction in the TTL field, a calculation of the check-sum, collection of control information used therein and generation of the control information.

The segmentation and reassembly system cooperates with the data processing system 10 as follows. The ATM cells 4 successively arrive at the ATM cell receiver 1. The ATM cell receiver 1 checks the header H1 of each ATM cell 4 to determine where the payload PR1 is stored. The ATM cell receiver 1 selectively writes pieces of payload and associated control data into the frame buffers 31 to 3n through the internal bus system 40. Thus, pieces of composite data are accumulated in the frame buffers 31 to 3n, and incomplete frames are respectively grown to complete frames.

The composite processing units sequentially fetch the pieces of composite data BY/B1/ . . . /B2/B3 in the frame buffers 31 to 3n, and start the associated engines 111 to 11k for the data processing. The results of the data processing are reflected to the incomplete/complete frames in the frame buffers 31 to 3n.

If undefined data process is required, the controller 9 requests the central processing unit 15/16 to execute the data processing through the CPU interface 19. The controller 9 may decide the segmentation and reassembly system is in trouble, and gives an alarm.

Upon completion of the data processing by the engines 111 to 11k, the ATM cell transmitter 2 segmentalizes the frames stored in the frame buffers 31 to 3n, and writes the pieces of data into the data fields of the ATM cells 5 assigned to the payloads PR2. Thus, the pieces of data are processed for the ATM layer, and are delivered to the ISDN.

In the segmentation and reassembly system according to the present invention, the pieces of composite data are transferred through the exclusive interfaces 201–20k/24, 251–25k/271–273 to the data processing system. This results in decrease of the size of data transferred through the CPU interface. As a result, the data processing speed is enhanced, and the segmentation and the reassembly system has improved throughput. The enhancement of data processing speed results in reduction in the system cost.

The segmentation and reassembly system according to the present invention reduces the data transfer carried out by the central processing units, and gives a surplus to the central processing units. The surplus is available for a high-level data processing. Otherwise, the manufacturer reduces the central processing units incorporated in the data processing units. Thus, the segmentation and reassembly system according to the present invention allows the manufacturer to reduce the production cost of the data processing system.

Although particular embodiments of the present invention have been shown and described, it will be apparent to those skilled in the art that various changes and modifications may be made without departing from the spirit and scope of the present invention.

What is claimed is:

1. A segmentation and reassembly system cooperating with a data processing system having at least one central processing unit connected through a CPU interface and special purpose engines, comprising:

a plurality of frame buffers for storing pieces of data selectively supplied from first ATM cells; and a processing means connected to said plurality of frame buffers for selectively accessing said pieces of data, and selectively supplying at least selected pieces of data to said special purpose engines through an exclusive interface for modifying said pieces of data, if necessary.

2. The segmentation and reassembly system as set forth in claim 1, further comprising an ATM cell receiver receiving said first ATM cells from a communication network and connected to said plurality of frame buffers for distributing said pieces of data to said plurality of frame buffers, and an ATM cell transmitter connected to said plurality of frame buffers and producing second ATM cells from said pieces of data after completion of a data processing carried out by said special purpose engines for supplying said second ATM cells to said communication network.

3. The segmentation and reassembly system as set forth in claim 2, in which said processing means includes a plurality of processing units respectively connected to said special purpose engines through a plurality of exclusive sub-interfaces of said exclusive interface, and said plurality of exclusive sub-interfaces independently transfer said selected pieces of data to said special purpose engines.

4. The segmentation and reassembly system as set forth in claim 3, in which said plurality of processing units request the associated special purpose engines to carry out different tasks, respectively.

5. The segmentation and reassembly system as set forth in claim 3, in which said plurality of processing units request the associated special purpose engines to carry out a same task, respectively.

6. The segmentation and reassembly system as set forth in claim 2, in which said processing means has a single processing unit connected to said special purpose engines through a plurality of exclusive sub-interfaces of said exclusive interface, and said plurality of exclusive sub-interfaces independently transfer said selected pieces of data to said special purpose engines.

7. The segmentation and reassembly system as set forth in claim 2, in which said processing means has a single processing unit connected to said special purpose engines through said exclusive interface, and said exclusive interface has a single data path connected between said single processing unit and said special purpose engines and a plurality of control lines connected from said single processing unit to said special purpose engines for selectively transferring said selected pieces of data to said special purpose engines.

8. The segmentation and reassembly system as set forth in claim 4, in which one of said special purpose engines and another of said special purpose engines respectively consume a first time period for completing a given task and a second time period longer than said first time period for completing another given task, and a buffer memory is connected to one of said exclusive sub-interfaces associated with said one of said special purpose engines.

9. The segmentation and reassembly system as set forth in claim 2, in which said selected pieces of data are different in protocol, and are assigned to certain special purpose engines selected from said special purpose engines.

10. The segmentation and reassembly system as set forth in claim 2, in which a data processing for a protocol conversion and a data processing for a statistical service are respectively assigned to certain special purpose engines selected from said special purpose engines.

* * * * *

UNITED STATES PATENT AND TRADEMARK OFFICE
CERTIFICATE OF CORRECTION

PATENT NO.   : 6,493,356 B1
DATED        : December 10, 2002
INVENTOR(S)  : Tatsuo Aramizu et al.

It is certified that error appears in the above-identified patent and that said Letters Patent is hereby corrected as shown below:

<u>Column 1,</u>
Lines 20-26 delete "The segmentation and reassembly system accumulates the pieces of fixed-speed data such as voice data in a frame buffer. If the segmentation and reassembly system accumulates the pieces of voice data supplied through a single channel, the segmentation and reassembly system consumes a lot of time for completing the ATM cell. This results in undesirable time lag." insert -- The segmentation and reassembly system is further operative to assemble pieces of data into an ATM cell. The pieces of data are stored in a field assigned to a payload, and an ATM header and a payload header are added to the payload. In this way, the segmentation and reassembly system produces the ATM cell, and supplies the ATM cell to the ISDN --

Lines 27-34, delete the paragraph "The segmentation and reassembly system accumulates the pieces of voice data supplied through a single channel, the segmentation and reassembly system consumes long time for competing the ATM cell. This results in undesirable time." insert -- The segmentation and reassembly system accumulates the pieces of fixed-speed data such as voice data in a frame buffer. If the segmentation and reassembly system accumulates the pieces of voice data supplied through a single channel, the segmentation and reassembly system consumes a lot of time for completing the ATM cell. This results in undesirable time lay. --

Signed and Sealed this

Twenty-third Day of September, 2003

JAMES E. ROGAN
*Director of the United States Patent and Trademark Office*